United States Patent
Fedor et al.

(10) Patent No.: US 9,528,377 B2
(45) Date of Patent: Dec. 27, 2016

(54) METHOD AND SYSTEM FOR COOLING ROTOR BLADE ANGELWINGS

(71) Applicant: General Electric Company, Schenectady, NY (US)

(72) Inventors: Michael James Fedor, Simpsonville, SC (US); David Richard Johns, Simpsonville, SC (US); Richard William Johnson, Greer, SC (US)

(73) Assignee: General Electric Company, Schenectady, NY (US)

( * ) Notice: Subject to any disclaimer, the term of this patent is extended or adjusted under 35 U.S.C. 154(b) by 536 days.

(21) Appl. No.: 13/972,667

(22) Filed: Aug. 21, 2013

(65) Prior Publication Data
US 2015/0056073 A1 Feb. 26, 2015

(51) Int. Cl.
*F01D 5/08* (2006.01)

(52) U.S. Cl.
CPC ............... *F01D 5/081* (2013.01); *F01D 5/08* (2013.01); *F01D 5/082* (2013.01); *F01D 5/085* (2013.01); *F01D 5/087* (2013.01); *F01D 5/088* (2013.01); *Y02T 50/673* (2013.01); *Y02T 50/676* (2013.01)

(58) Field of Classification Search
CPC . F01D 5/08–5/088; F01D 5/186; F01D 25/08; F01D 25/12; Y02T 50/675; Y02T 50/676
USPC .................................... 416/1, 95, 96 R, 97 R
See application file for complete search history.

(56) References Cited

U.S. PATENT DOCUMENTS

| | | | |
|---|---|---|---|
| 6,402,471 B1 * | 6/2002 | Demers | F01D 5/081 415/115 |
| 7,993,102 B2 | 8/2011 | Desai et al. | |
| 8,016,297 B2 | 9/2011 | Heinemann et al. | |
| 8,038,399 B1 | 10/2011 | Liang | |
| 8,057,157 B2 | 11/2011 | Roush et al. | |
| 8,186,933 B2 | 5/2012 | Doss et al. | |
| 8,277,177 B2 | 10/2012 | Liang | |
| 2008/0008574 A1 | 1/2008 | Brillert | |
| 2010/0054954 A1 * | 3/2010 | Itzel | F01D 5/186 416/97 R |
| 2012/0070305 A1 * | 3/2012 | Ammann | F01D 5/082 416/97 R |
| 2013/0108441 A1 * | 5/2013 | Ingram | F01D 11/04 416/1 |
| 2013/0170983 A1 * | 7/2013 | Babu | F01D 11/04 416/1 |

\* cited by examiner

*Primary Examiner* — Thomas Denion
*Assistant Examiner* — Laert Dounis
(74) *Attorney, Agent, or Firm* — Armstrong Teasdale LLP

(57) ABSTRACT

A system for cooling an angelwing coupled to a rotor blade in a gas turbine engine is provided. An angelwing coupled to a shank of a rotor blade includes at least one cooling passage extending from at least one inlet opening coupled in flow communication with a gas turbine engine inner wheelspace to at least one outlet opening coupled in flow communication with a gas turbine engine outer rotor/stator cavity. The at least one outlet opening is located in an upper surface of the angelwing. The at least one cooling passage receives pressurized cooling air channeled from the inner wheelspace, such that the pressurized cooling air is channeled into the at least one inlet opening and discharged from the at least one outlet opening.

20 Claims, 7 Drawing Sheets

METHOD AND SYSTEM FOR COOLING ROTOR BLADE ANGELWINGS

BACKGROUND OF THE INVENTION

This invention relates generally to turbines, and, more specifically, to cooling angelwing structures used within gas turbine engines.

At least some known gas turbine engines include an outer rotor/stator cavity through which hot combustion gases pass, and an inner wheelspace that includes components fabricated from materials having a temperature resistance that is lower than temperatures present in the outer rotor/stator cavity. Furthermore, at least some known gas turbine engines include rotor blades. A rotor blade includes a shank, and a connecting structure coupled to the shank, such as a dovetail, used to couple a rotor blade to a rotor wheel. An airfoil is also coupled to the shank. In at least some known rotor blade constructions, the shank includes fore and/or aft walls that extend transversely relative to an axis of rotation of the gas turbine engine. In addition, in at least one known gas turbine engines, at least one cover plate is coupled to a rotor blade and the rotor wheel to facilitate preclusion of gas leakage therebetween.

In at least some known rotor blade constructions, structures commonly referred to as "angelwings," extend axially fore and/or aft from the shank. In at least some known gas turbine engines, at least two angelwings are provided that extend from an upstream-facing shank wall and/or a downstream-facing shank wall of a rotor blade, such that a first angelwing (hereinafter referred to as a "lower" angelwing) is located radially inwardly of a second angelwing (hereinafter referred to as an "upper" angelwing). When two angelwings are present and facing in the same direction (e.g., extending from a forward face of a shank), the upper or outermost angelwing facilitates prevention of ingestion of hot combustion gases into a buffer cavity defined between the upper and lower angelwings, and both upper and lower angelwings facilitate prevention of ingestion of hot combustion gases into the inner wheelspace. Prevention of hot combustion gas ingestion is desirable to facilitate prevention of damage to inner wheelspace components due to exposure to the hot combustion gases.

In at least some known gas turbine engines, cooling air is channeled under pressure into the inner wheelspace for facilitating prevention of hot combustion gas ingestion into the inner wheelspace. However, the channeling of cooling air into the inner wheelspace may have the effect of reducing engine efficiency. As a result, gas turbine engine designs are evolving such that the amount of cooling air channeled into the inner wheelspace is being reduced. Moreover, in at least some known gas turbine engines, combustion firing temperatures are being increased. Accordingly, providing cooling for gas turbine engine components, in particular components within the inner wheelspace, and preventing ingestion of hot combustion gases, present challenges to designers of gas turbine engines.

In at least some known gas turbine engines, upper surfaces of the angelwings are directly exposed to the hot combustion gases, especially upper angelwings, if both upper and lower angelwings are provided. Accordingly, it is desirable to provide for cooling of the upper surfaces of the angelwings, to facilitate lowering of temperatures of the upper surfaces of the angelwings and to facilitate the prevention of potential creep-related failure of the angelwings. It is further desirable to provide for cooling of upper surfaces of a lower angelwing, if present, to facilitate purging of hot gases from the buffer space, towards facilitating prevention of ingestion of hot combustion gases into the buffer space.

BRIEF DESCRIPTION OF THE INVENTION

In one aspect, a method for cooling an angelwing in a gas turbine engine is provided. The method includes coupling an angelwing to a shank of a rotor blade of a gas turbine engine, the rotor blade coupled for rotation in a first direction about an axis of rotation. The method also includes defining at least one cooling passage extending through the shank and the angelwing, from at least one inlet opening located on the shank to at least one outlet opening located on an upper surface of the angelwing, such that the at least one inlet opening is coupled in flow communication with an inner wheelspace of the gas turbine engine and the at least one outlet opening is coupled in flow communication with an outer rotor/stator cavity of the gas turbine engine. The method also includes supplying pressurized cooling air to the inner wheelspace, such that the pressurized cooling air is channeled into the at least one inlet opening and discharged from the at least one outlet opening.

In still another aspect, a system for cooling an angelwing in a gas turbine engine is provided. The system includes an angelwing coupled to a shank of a rotor blade of a gas turbine engine, the rotor blade coupled for rotation about an axis in a first direction. The system also includes at least one cooling passage extending from at least one inlet opening located in the shank to at least one outlet opening located in an upper surface of the angelwing, such that the at least one inlet opening is coupled in flow communication with an inner wheelspace of the gas turbine engine and the at least one outlet opening is coupled in flow communication with an outer rotor/stator cavity of the gas turbine engine. The system also includes the at least one cooling passage configured for use in receiving pressurized cooling air from the inner wheelspace, such that the pressurized cooling air is channeled into the at least one inlet opening and discharged from the at least one outlet opening.

DETAILED DESCRIPTION OF THE INVENTION

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine.

Figure 1:
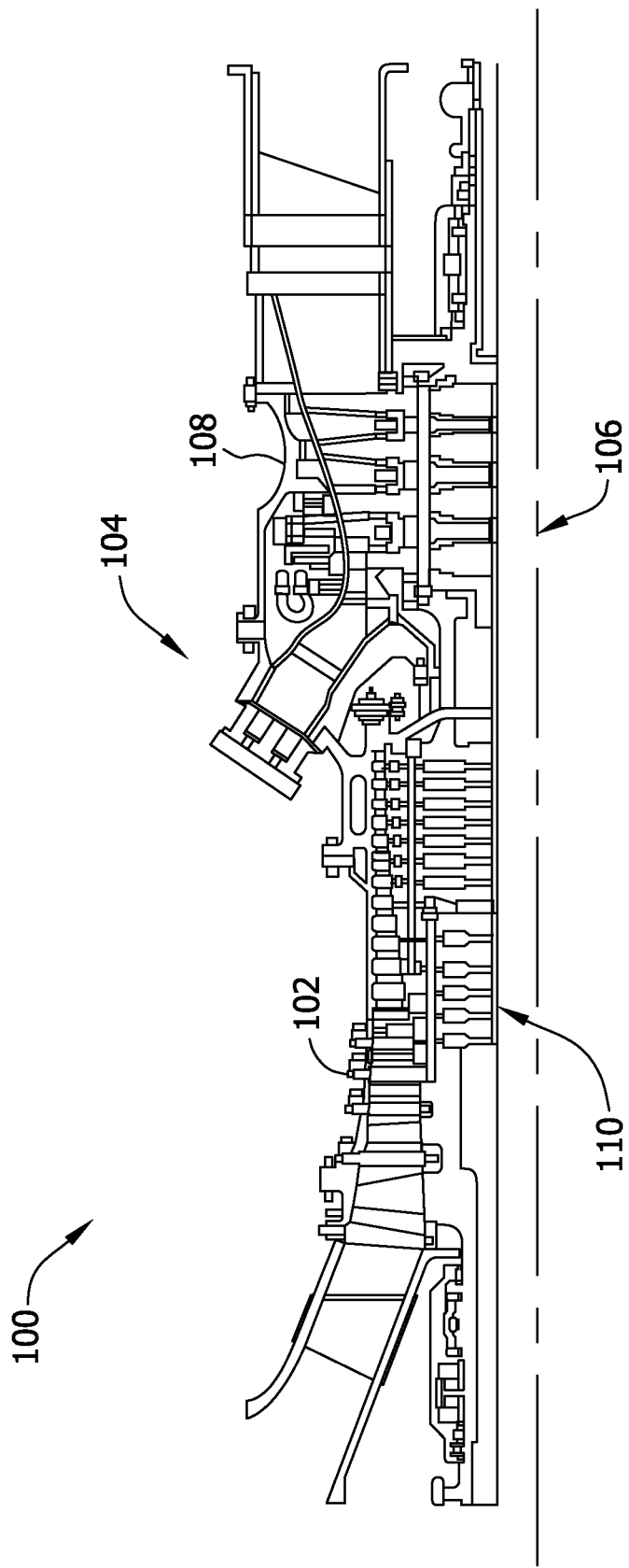
FIG. 1 is a schematic illustration of a gas turbine engine, in which an exemplary cooling method and system may be used.

FIG. 1 is a schematic illustration of an exemplary gas turbine engine 100. Engine 100 includes a compressor assembly 102 and a combustor assembly 104. Engine 100 also includes a turbine 108 and a common compressor/turbine rotor 110.

In operation, air flows through compressor assembly 102 such that compressed air is supplied to combustor assembly 104. Fuel is channeled to a combustion region and/or zone (not shown) that is defined within combustor assembly 104 wherein the fuel is mixed with the air and ignited. Combustion gases generated are channeled to turbine 108 wherein gas stream thermal energy is converted to mechanical rotational energy. Turbine 108 includes one or more rotor wheels 112 (shown in FIG. 2) that are rotatably coupled to rotor 110, for rotation about an axis of rotation 106. It should also be appreciated that the term "fluid" as used herein includes any medium or material that flows, including, but not limited to, gas and air.

Figure 2:
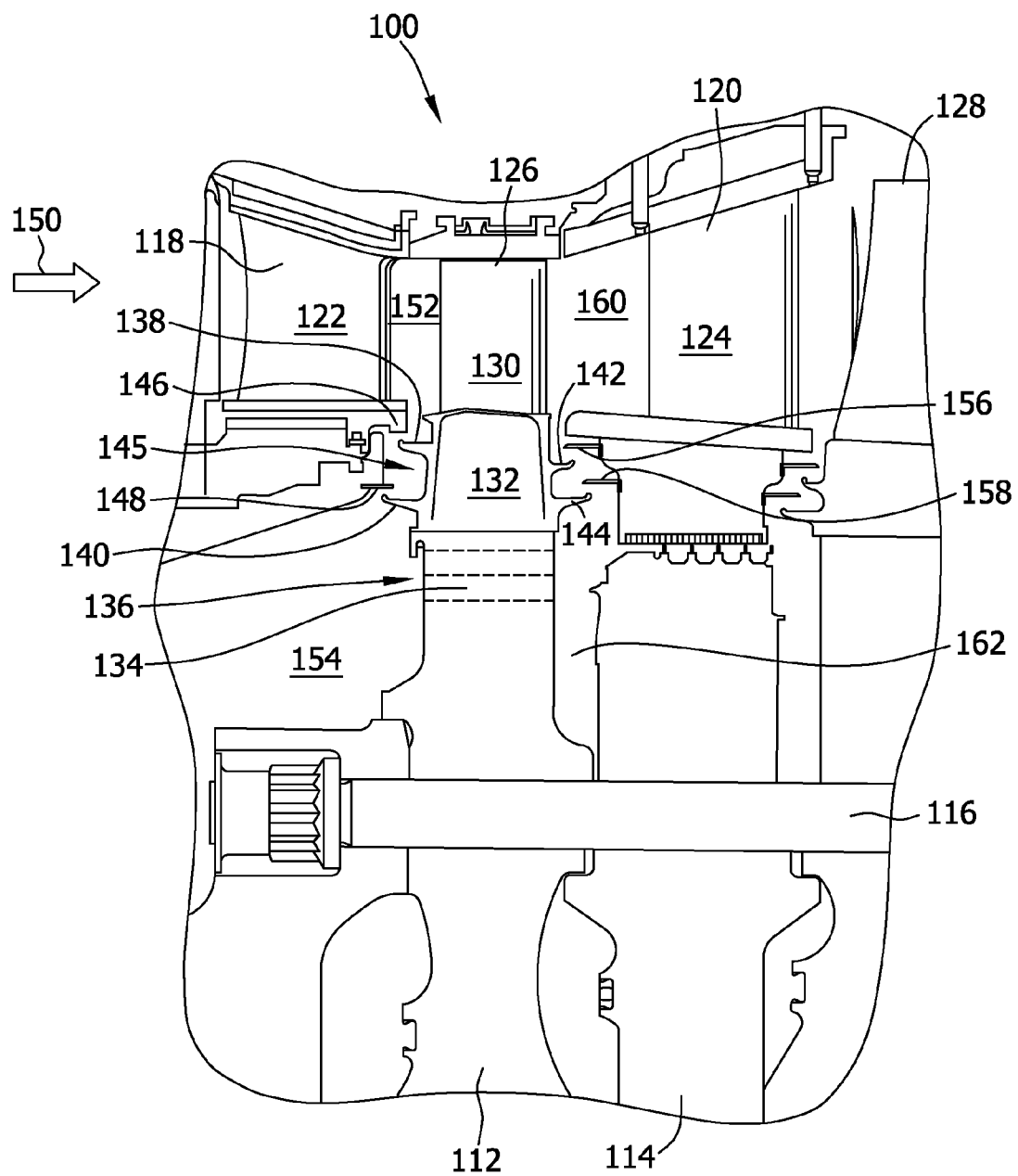
FIG. 2 is an enlarged schematic side sectional view of a portion of the gas turbine engine illustrated in FIG. 1.

FIG. 2 is an enlarged schematic illustration of a portion of gas turbine engine 100 that includes axially spaced apart rotor wheels 112 and spacers 114 that are coupled to each other, for example, by a plurality of circumferentially spaced, axially extending bolts 116. Although bolts 116 are shown in FIG. 2, for facilitating coupling of wheels 112 to spacers 114, any other suitable coupling structures may be used that enable gas turbine engine 100 to function as described herein. Gas turbine engine 100 includes, for example, a first nozzle stage 118 and a second nozzle stage 120. Each of nozzle stages 118 and 120 includes a plurality of circumferentially spaced stator vanes, such as stator vanes 122 and 124. A plurality of first-stage rotor blades 126 is coupled to rotor 110, for rotation between nozzle stages 118 and 120. Similarly, a plurality of second-stage rotor blades 128 likewise is coupled to rotor 110, for rotation between second-stage nozzles 120 and a third stage of nozzles (not shown). Although two stages of rotor blades 126 and 128, and two nozzle stages 118 and 120, are shown and described herein, at least some known gas turbine engines include different numbers of nozzle and rotor blade stages.

Each rotor blade 126 is coupled to rotor wheel 112 using any suitable coupling method that enables gas turbine engine 100 to function as described herein. For example, each rotor blade 126 includes an airfoil 130, and a dovetail 134 that is insertably received axially (i.e., in a direction parallel to axis of rotation 106 illustrated in FIG. 1) within a similarly-shaped slot 136 in rotor wheel 112. Each rotor blade 126 further includes a plurality of angelwings 138, 140, 142, and 144 that extend axially fore and aft from shank 132. Although four angelwings 138-144 are shown in FIG. 2, rotor blade 126 may include any number of angelwings sufficient to enable it to function as described herein. Angelwings 138 and 140 define between them a buffer cavity 145. Angelwing 138 facilitates prevention of hot combustion gas ingestion into buffer cavity 145. Moreover, angelwings 138 and 140 cooperate with stator structures 146 and 148, respectively, to facilitate preventing hot combustion gases 150 from being ingested from an outer rotor/stator cavity 152, into an inner wheelspace 154. Similarly, angelwings 142 and 144 cooperate with stator lands 156 and 158, respectively, to facilitate preventing hot combustion gases 150 from being ingested from an outer rotor/stator cavity 160 into an inner wheelspace 162. In an exemplary embodiment, similar cooperating sets of angelwings and stator lands or other structures are provided for each rotor wheel stage and adjacent nozzle stage of gas turbine engine 100. In alternative embodiments, cooperating sets of angelwings and stator lands or other structures are provided at only rotor wheel stage and adjacent nozzle stage of gas turbine engine 100, or at only some (but not all) of the rotor wheel stages and adjacent nozzle stages of gas turbine engine 100.

Figure 3:
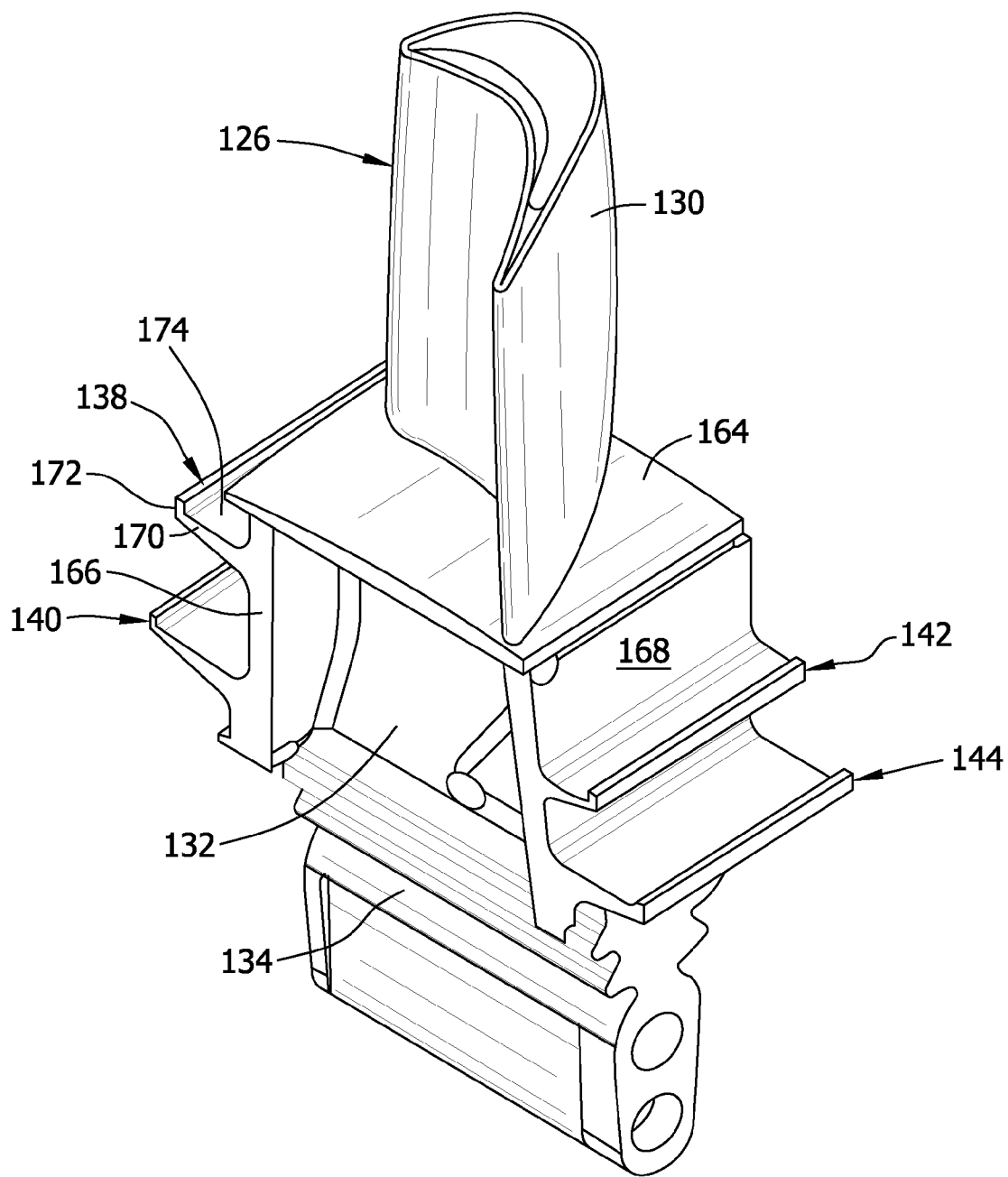
FIG. 3 is an enlarged perspective view of an exemplary rotor blade, for use in the gas turbine engine illustrated in FIGS. 1 and 2.

FIG. 3 is a perspective view of rotor blade 126 illustrated in FIG. 2. Rotor blade 126 includes, as described, airfoil 130 coupled to shank 132, from which angelwings 138-142 extend axially, and dovetail 134. Shank 132 includes a platform 164, a fore shank wall 166 and an aft shank wall 168. In at least some known rotor blades, each of angelwings 138-144, for example angelwing 138, includes a body 170 and an upturned tip 172. In an exemplary angelwing 138, body 170 includes an upper surface 174 that extends concentrically with axis of rotation 106 (illustrated in FIG. 1). In at least some known rotor blade constructions, upper surfaces 174 of angelwings 138-144 are configured to be upwardly concave with respect to a direction parallel to axis of rotation 106. In at least some other known rotor blade constructions, upper surfaces 174 of angelwings 138-144 are flat, or upwardly convex, with respect to a direction parallel to axis of rotation 106.

Figure 4:
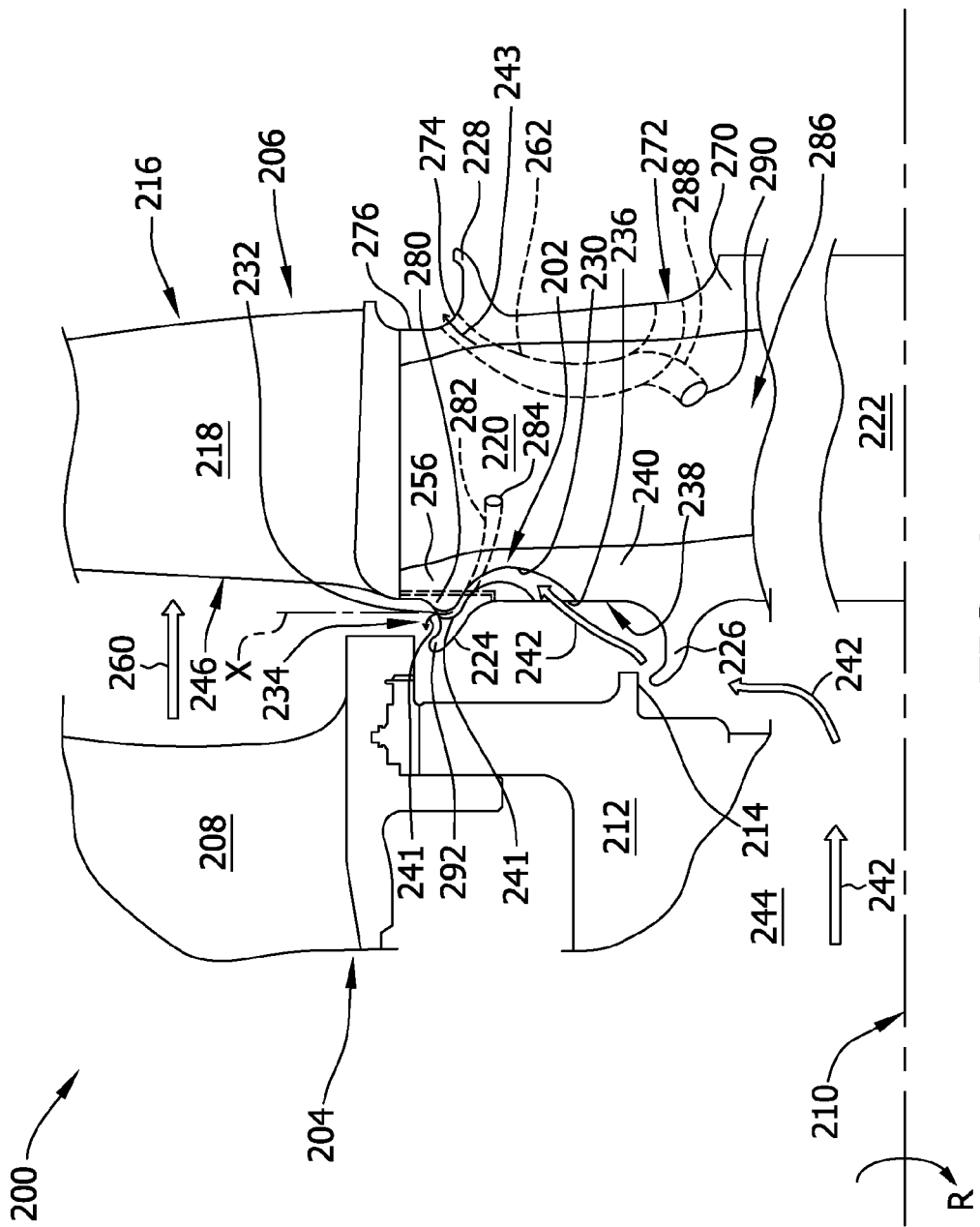
FIG. 4 is a schematic side sectional view of a portion of a gas turbine engine illustrating an exemplary alternative system for cooling an upper surface of an anglewing.

FIG. 4 illustrates an enlarged sectional view of a portion of a gas turbine engine 200 in which an exemplary angelwing cooling system 202 may be used for cooling an angelwing 224. In the exemplary embodiment, gas turbine engine 200 includes at least one nozzle stage 204 and at least one rotor blade stage 206. Nozzle stage 204 includes a plurality of stator vanes 208 arranged circumferentially about a rotor axis of rotation 210. Each stator vane 208 is coupled to a stator support structure 212 that supports one or more axially-extending lands 214. In an exemplary embodiment, one or more of lands 214 extends at least partially circumferentially around and concentric to axis of rotation 210. Rotor blade stage 206 includes a plurality of rotor blades 216. Each rotor blade 216 includes an airfoil 218 coupled to a shank 220, which is, in turn, coupled to a wheel 222. Wheel 222 is coupled for rotation in a first direction R about axis of rotation 210. Direction R is also sometimes referred to as the swirl direction.

Figure 5:
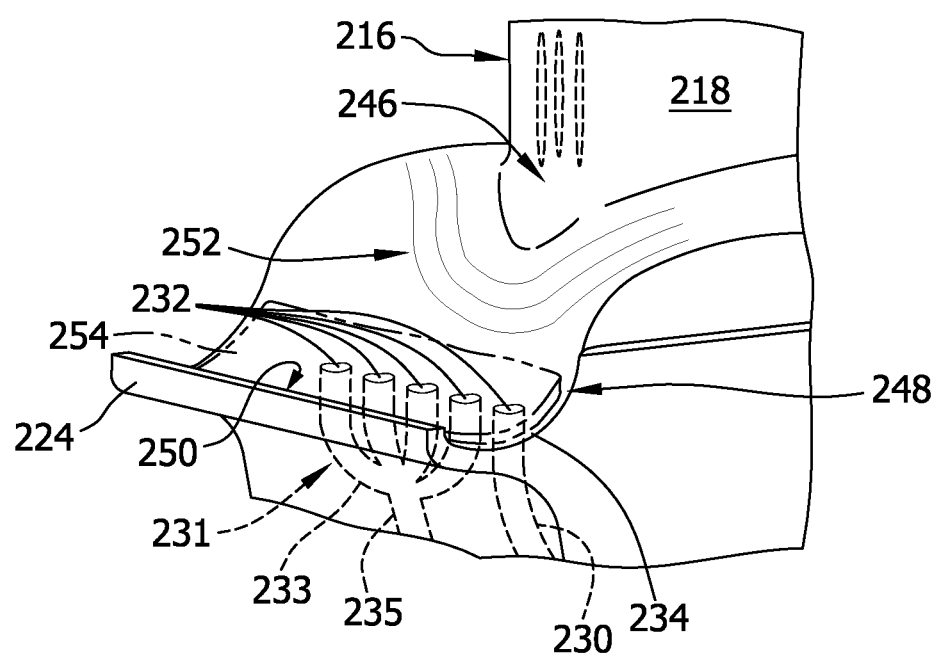
FIG. 5 is an enlarged perspective view of a gas rotor blade angelwing illustrating an exemplary arrangement of cooling apertures in an upper surface of the angelwing.

Rotor blade 216 includes a plurality of axially-extending angelwings, including upper angelwing 224, a lower angelwing 226, and an upper angelwing 228. Cooling system 202 includes at least one upper angelwing 224, for example, defined with at least one internal cooling passage 230. In the exemplary embodiment, each cooling passage 230 extends from an inlet opening 236 in a face 238 of a shank wall 240 of shank 220 to an outlet opening 232 in an upper surface 234 of angelwing 224. FIG. 5 is an enlarged perspective view of rotor blade 216, in which airfoil 218 is illustrated. Five outlet openings 232 are located in upper surface 234 of angelwing 224. In the exemplary embodiment, cooling passage 230 is shown in FIGS. 4 and 5 as being defined in shank wall 240, which faces in an upstream direction relative to a flow 260 of hot combustion gases. In alternative embodiments, at least one cooling passage 262 may be provided, instead of, or in addition to, at least one cooling passage 230. Cooling passage 262 extends from an inlet opening 272 located in a downstream-facing shank wall 270 to an outlet opening 274 located in an upper surface 276 of a downstream-extending angelwing 228.

In the exemplary embodiment, a plurality of passages 230 is provided, such that each passage 230 is separate from each other passage 230. Furthermore, each passage 230 includes a corresponding inlet opening 236 and a corresponding outlet opening 232. While five outlet openings 232 are shown in FIG. 5, for five corresponding passages 230 (not shown), in alternative embodiments, any number of passages 230 with corresponding outlet openings 232 and inlet openings 236 may be used to enable cooling system 202 to function as described herein. In alternative embodiments, two or more of openings 232 are coupled in a branching arrangement 231 via a plurality of branch passages 233 to a cooling passage 235. In other alternative embodiments, a similar branching arrangement is used to couple a plurality of inlet openings 236 in flow communication with a single cooling passage. In still other alternative embodiments, both inlet openings 236 and outlet openings 232 are coupled to branching arrangements.

In the exemplary embodiment of FIGS. 4 and 5, cooling air 242 is channeled into an inner wheelspace 244 of engine 200, using any suitable structure that enables engine 200 to function as described. During operation of engine 200, cooling air 242 is prompted to move radially outwardly between stator support structure 212 and rotor blade 216. After cooling air 242 is channeled radially past angelwing 226 and land 214, cooling air 242 is channeled via at least one inlet opening 236 into at least one cooling passage 230. Cooling air 242 exits at least one cooling passage 230 via at least one outlet opening 232. In an exemplary embodiment, after exiting outlet opening 232, cooling air 242 defines a protective cooling air film layer 254 (shown in FIG. 5) over upper surface 234 of angelwing 224. In an alternative embodiment, cooling air 242, in addition to or instead of defining cooling film layer 254, cooling air 242 facilitates purging hot combustion gases from inner wheelspace 244 and/or facilitates prevention of ingestion of hot combustion gases into inner wheelspace 244.

In the exemplary embodiment, a plurality of outlet openings 232 is oriented on angelwing 224, such that outlet openings 232 are substantially circumferentially aligned with a leading edge 246 (shown in FIGS. 4 and 5) of airfoil 218. During operation, leading edge 246 generates a bow wave 252 (shown in FIG. 5) in the vicinity of which location combustion gas pressure and temperature both may reach significant values. Accordingly, orienting at least one outlet opening 232 axially upstream of and substantially radially aligned with leading edge 246 facilitates the formation of cooling air film layer 254 at locations where high-temperature combustion gases are encountered and/or at locations where ingestion of high-temperature combustion gases is likely to occur. In alternative embodiments, a plurality of outlet openings 232 may be circumferentially spaced apart from each other, with any spacing suitable to enable cooling system 202 to function as described herein.

Cooling passage 230, inlet opening 236 and/or outlet opening 232 may have any cross-sectional shape, as viewed in the direction of flow of cooling air 242 that enables system 202 to function as described herein. For example, cooling passage 230, inlet opening 236, and/or outlet opening 232 may have a cross-sectional shape in the form of a circle, an ellipse, a polygon, or any other configuration that enables system 202 to function as described herein. Moreover, a cross-sectional area of passage 230 may vary along a length of passage 230 in any desired manner from outlet opening 232 to inlet opening 236 that enables system 202 to function as described herein. Furthermore, a passage 230 may follow any path through shank wall 240 and angelwing 224 that enables system 202 to function as described. For example, a passage 230 may follow a serpentine path that increases cooling of shank wall 240 and angelwing 224 by increasing the length, and thus an internal surface area, of passage 230, and accordingly, a time of passage of cooling air 242 through passage 230, towards increasing an amount of heat that may be transferred from shank wall 240 and angelwing 224 into cooling air 242. Alternatively, if desired, transfer of heat into cooling air 242 prior to discharge from outlet opening 232 can be reduced by making passage 230 follow a more direct path between inlet opening 236 and outlet opening 232, and/or reducing a diameter of passage 230, towards reducing the internal surface area of passage 230.

By providing cooling air film layer 254 on upper surface 234 of angelwing 224, temperatures at upper surface 234 and an upper portion 256 of shank wall 240 can be controlled using a reduced volume of cooling air channeled through inner wheelspace 244, as compared to relying only on cooling air channeled solely between nozzle stage 204 and rotor blade stage 206. Selective location of outlet openings 232 enables cooling air 242 to be channeled to locations where cooling is needed most. While in the exemplary embodiment, cooling system 202 includes passage 230 configured to supply cooling air 242 to an upper surface 234 of an upper angelwing 224, in alternative embodiments, cooling system 202 may also provide a passage (not shown) in lower angelwing 226, instead of, or in addition to, passage 230.

In the exemplary embodiment of FIGS. 4 and 5, outlet openings 232 are positioned in a downstream portion 248 (illustrated in FIG. 5) of upper surface 234, proximate a root 280 (illustrated in FIG. 4) of angelwing 224. In alternative embodiments, one or more outlet openings 232 may be located in portions of upper surface 234 that are proximate an upstream tip 250 of angelwing 224, or in portions of upper surface 234 between upstream tip 250 and downstream portion 248. Moreover, in exemplary embodiments, one or more of outlet openings 232 may be oriented such that cooling air 242 is discharged in a purely radial direction, relative to axis of rotation 210, as illustrated in FIGS. 4 and 5. In alternative embodiments, one or more of outlet openings 232 may be oriented such that cooling air 242 is discharged in an at least partially upstream direction 241, or in an at least partially downstream direction 243. Furthermore, one or more openings 232 may be oriented within angelwing 224 such that cooling air 242 is discharged toward a direction of rotation of rotor blade 216, against a direction of rotation of rotor blade 216, or radially, relative to rotor blade 216.

In an alternative embodiment, instead of passage 230 that extends from opening 326 in shank wall 240 to opening 232, a passage 282 extends between an opening 284 in a pocket 286 of shank 220 and opening 232. Similarly, in an alternative embodiment, instead of passage 262 that extends from opening 272 in shank wall 270 to opening 274, a passage 288 extends from an opening 290 in pocket 286 to opening 274.

In another alternative embodiment, angelwing 224 is part of a cover plate 292 affixed to shank 220. Cover plate 292 is a non-integral plate attached to rotor blade 216 for facilitating prevention of leakage between rotor blade 216 and wheel 222. Accordingly, passage 230 extends through shank wall 240 as well as through cover plate 292.

Figure 6:
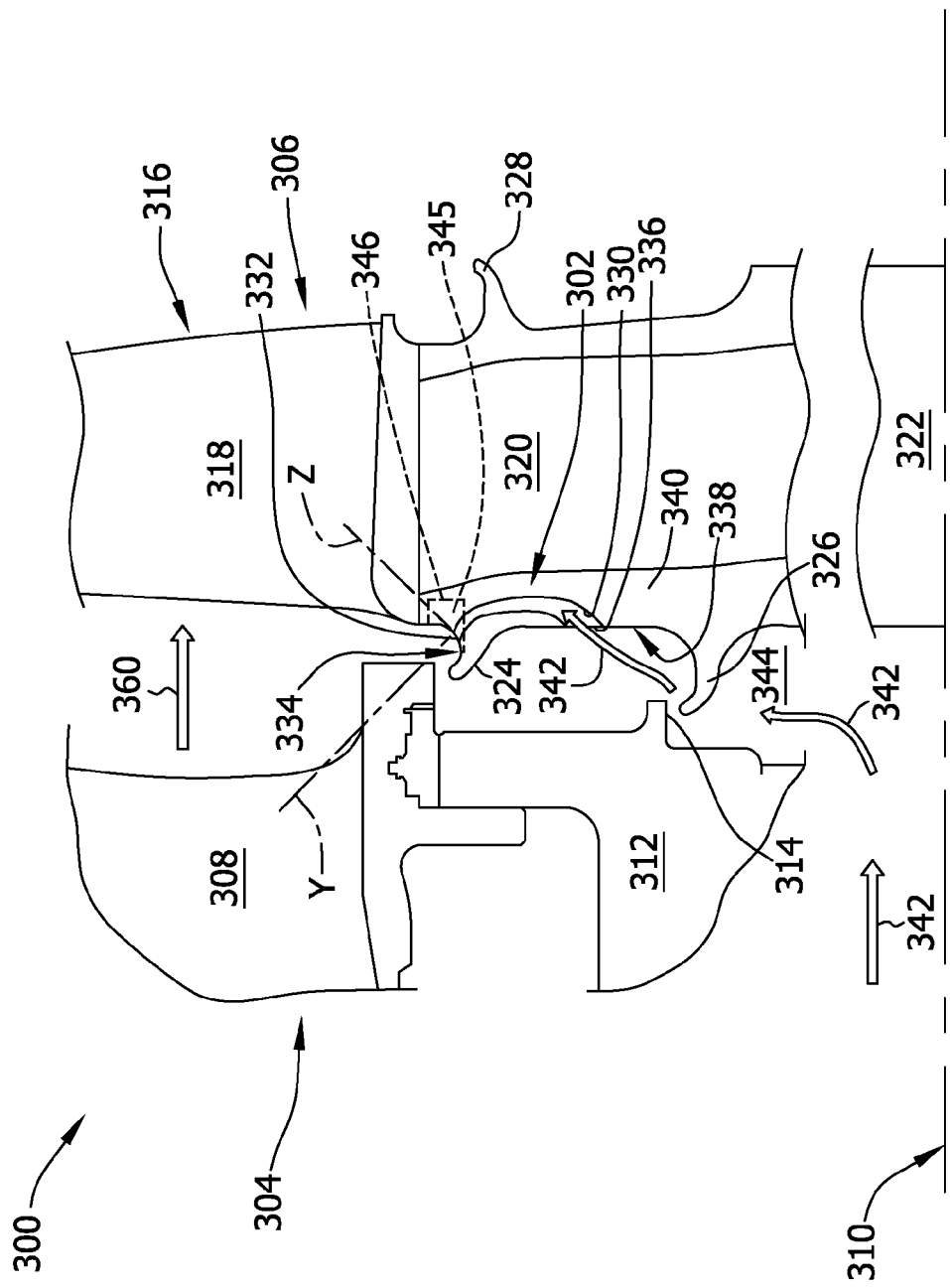
FIG. 6 is a schematic side sectional view of a portion of a gas turbine engine illustrating another exemplary alternative system for cooling an upper surface of an anglewing.

FIG. 6 illustrates an enlarged sectional view of a portion of a gas turbine engine 300 in which an alternative exemplary angelwing cooling system 302 may be used for cooling an angelwing 324, in protection against heat from a combustion gas flow 360. In the exemplary embodiment, gas turbine engine 300 includes at least one nozzle stage 304 and at least one rotor blade stage 306. Nozzle stage 304 includes a plurality of stator vanes 308 arranged circumferentially about a rotor axis of rotation 310. Each stator vane 308 is coupled to a stator support structure 312 that supports one or more axially-extending lands 314. In an exemplary embodiment, each of lands 314 extends at least partially circumferentially around and concentric to axis of rotation 310. Rotor blade stage 306 includes a plurality of rotor blades 316. Each rotor blade 316 includes an airfoil 318 coupled to a shank 320, which is, in turn, coupled to a wheel 322. Wheel 322 is coupled for rotation about axis 310.

Rotor blade 316 includes a plurality of axially-extending angelwings 324, 326, and 328. Cooling system 302 includes at least one angelwing 324, for example, defined with at least one internal cooling passage 330. In the exemplary embodiment, cooling passage 330 extends from an inlet opening 336 in a face 338 of a shank wall 340 of shank 320 to an outlet opening 332 in an upper surface 334 of angelwing 224. In the exemplary embodiment, a plurality of passages 330 are provided, such that each passage 330 is separate from each other passage 330. Furthermore, each passage 330 includes a corresponding inlet opening 336 and a corresponding outlet opening 332. Any number of passages 330 with corresponding inlet openings 336 and outlet openings 332 may be provided to enable cooling system 302 to function as described herein. In alternative embodiments, cooling passage(s) 330 may be provided with upstream- and/or downstream-oriented branching arrangements, such that a single cooling passage 330 may be coupled in flow communication with a plurality of inlet openings 336 and/or a plurality of outlet openings 332.

In the exemplary embodiment of FIG. 6, cooling air 342 is channeled into an inner wheelspace 344 of engine 300, using any suitable method that enables system 302 to function as described. During operation of engine 300, cooling air 342 is prompted to move radially outwardly between stator support structure 312 and rotor blade 316. After cooling air 342 is channeled radially past angelwing 326 and land 314, cooling air 342 is channeled via inlet opening 336 into passage 330. Cooling air 342 exits passage 330 via outlet opening 332. After exiting outlet opening 332, cooling air 342 defines a protective cooling air film over upper surface 334 of angelwing 324. In the exemplary embodiment of FIG. 6, outlet opening 332 is oriented such that cooling air 342 is discharged from opening 332 in a partially upstream direction toward nozzle stage 304. That is, in a direction substantially parallel to a forwardly-inclined axis Y (shown in FIG. 6).

In an alternative embodiment, shank wall 340 includes a cut-back region 345 adjacent angelwing 324 defined by a cut-back wall area 346 (illustrated in broken lines in FIG. 6). In this alternative embodiment, one or more of passages 330 and openings 332 are oriented such that cooling air is discharged in a direction substantially parallel to an axis Z (i.e., angled at least partially in the direction of flow 360), to ensure to facilitate discharge of cooling air into cut-back region 345 and/or impingement of cooling air against cut-back wall area 346.

Figure 7:
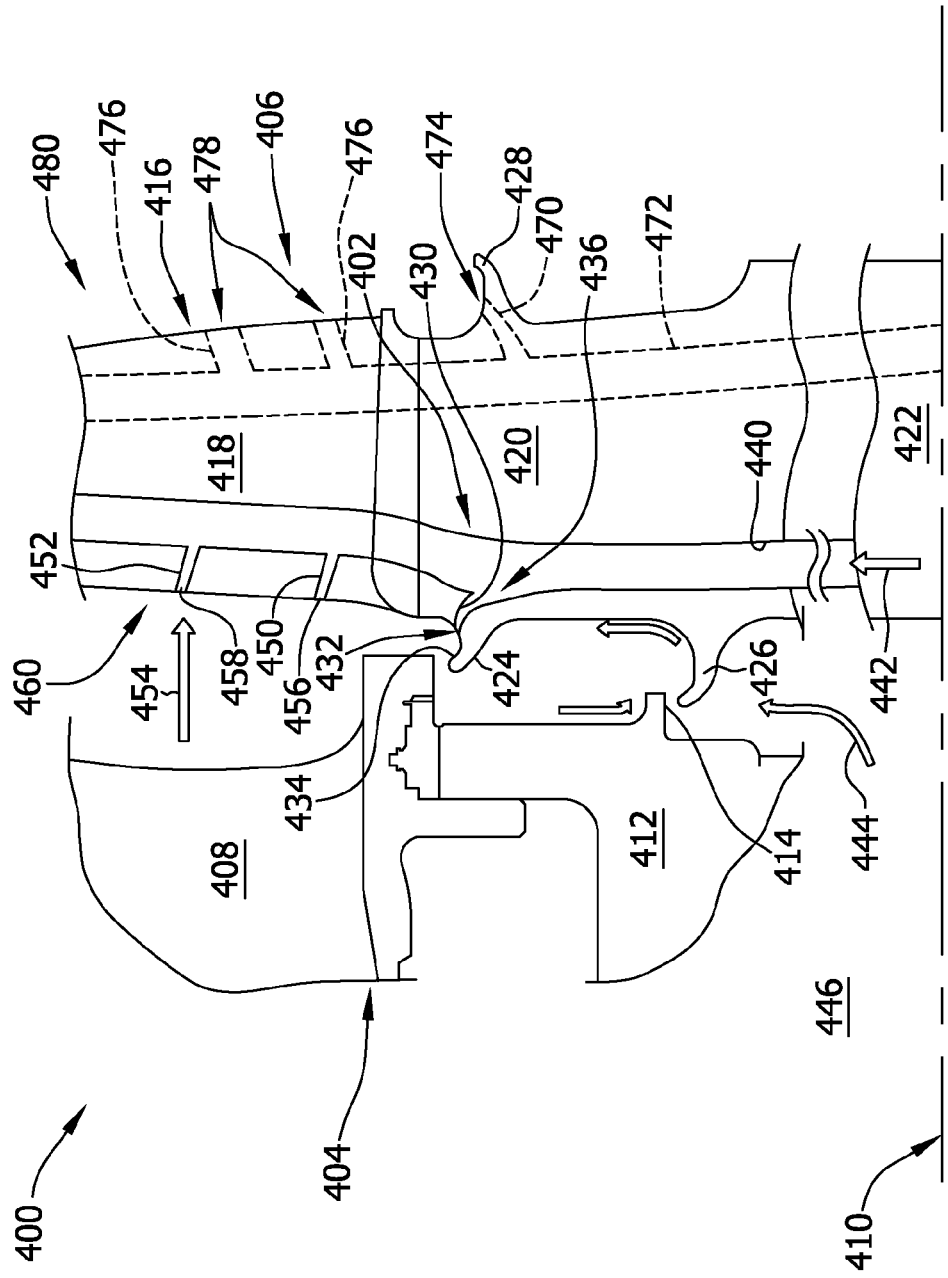
FIG. 7 is a schematic side sectional view of a portion of a gas turbine engine illustrating another exemplary alternative system for cooling an upper surface of an anglewing.

In some known gas turbine engines, the airfoils of the rotor blades are provided with internal cooling channels that lead to outlet openings located in the leading edge regions of the airfoils. FIG. 7 illustrates an enlarged sectional view of a portion of a gas turbine engine 400 in which an alternative exemplary angelwing cooling system 402 may be used for cooling an angelwing 424. In the exemplary embodiment, gas turbine engine 400 includes at least one nozzle stage 404 and at least one rotor blade stage 406. Nozzle stage 404 includes a plurality of stator vanes 408 circumferentially arranged about a rotor axis of rotation 410. Each stator vane 408 is coupled to a stator support structure 412 that supports one or more axially-extending lands 414. In an exemplary embodiment, each of lands 414 extends at least partially circumferentially around and concentric to axis of rotation 410. Rotor blade stage 406 includes a plurality of rotor blades 416. Each rotor blade 416 includes an airfoil 418 coupled to a shank 420, which is, in turn, coupled to a wheel 422 coupled for rotation about axis 410.

Rotor blade 416 includes a plurality of axially-extending angelwings 424, 426, and 428. Cooling system 402 includes at least one angelwing 424, for example, defined with at least one internal cooling passage 430. Cooling passage 430 extends from an inlet opening 436 that couples in fluid communication with a rotor blade cooling passage 440 extending from wheel 422 radially outwardly through rotor blade 416 to airfoil 418. Cooling passage 430 terminates in an outlet opening 432 in an upper surface 434 of angelwing 424. In the exemplary embodiment, a plurality of passages 430 is provided, such that each passage 430 is distinct from other passages 430. Furthermore, each passage 430 includes a corresponding inlet opening 436 and a corresponding outlet opening 432. Any number of passages 430 with corresponding outlet openings 432 and inlet openings 436 may be provided to enable cooling system 402 to function as described herein. In alternative embodiments, cooling passage(s) 430 may be forked or branched, such that more than one inlet opening may couple to each cooling passage, and/or each cooling passage may open onto more than one outlet opening.

In the exemplary embodiment of FIG. 7, cooling air 442 is channeled from a source (not shown) of cooling air into a rotor blade cooling passage 440, using any suitable method that enables system 402 to function as described. Airfoil cooling passages 450 and 452 are coupled in flow communication with rotor blade cooling passage 440 and terminate in outlet openings 456 and 458, respectively. Cooling air exiting outlet openings 456 and 458 facilitates cooling of a leading edge region 460 of airfoil 418, towards mitigating heating effects from a combustion gas flow 454. During operation of engine 400, cooling air 442 is prompted to move radially outwardly along passage 440. In addition, cooling air 442 may be channeled to passage 440 under pressure. Cooling air 442 exits passage 430 via an outlet opening 432. After exiting outlet opening 432, cooling air 442 defines a protective cooling air film over upper surface 434 of angelwing 424. In the exemplary embodiment of FIG. 7, outlet opening 432 is oriented such that cooling air 442 exiting opening 432 is oriented in an upstream direction toward nozzle stage 404. A separate flow 444 of cooling air from an inner wheelspace 446 cools external surfaces of angelwings 426 and 424.

In an alternative embodiment, system 402 includes, in addition to or instead of passage(s) 430, at least one cooling air passage 470 coupled to an airfoil cooling passage 472. Cooling air passage 470 extends to an opening 474 in an upper surface of angelwing 428. Airfoil cooling passage 472 is coupled to a source (not shown) of cooling air, and channels cooling air to one or more trailing edge cooling passages 476, which extend to corresponding openings 478 in a trailing edge region 480 of airfoil 418.

The rotor blade cooling systems described herein provide several advantages over known methods of cooling rotor blade angelwings. Specifically, the rotor blade cooling systems described herein facilitate a reduction in cooling air flow from the inner wheelspace of a gas turbine engine into the outer rotor/stator cavity, such that gas turbine engine output and efficiency are increased. In addition, the rotor blade cooling systems described herein facilitate the formation of a cooling air film layer at locations where cooling is needed most. The rotor blade cooling systems described herein also facilitate cooling of internal regions of rotor blade angelwings and shank walls. In some embodiments, the rotor blade cooling systems described herein facilitate cooling of angelwing upper surfaces using a portion of cooling air being channeled towards airfoil cooling passages.

Exemplary embodiments of a system and method for cooling turbine rotor blade angelwings are described above in detail. The method and system are not limited to the specific embodiments described herein, but rather, components of systems and/or steps of the methods may be utilized independently and separately from other components and/or steps described herein. For example, the method may also be used in combination with other rotating machine systems and methods, and are not limited to practice only with the gas turbine engine blades as described herein. Rather, the exemplary embodiment can be implemented and utilized in connection with many other rotary machine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. A method for cooling an angelwing in a gas turbine engine, said method comprising:
    coupling an angelwing to a shank of a rotor blade of a gas turbine engine, the rotor blade coupled for rotation in a first direction about an axis of rotation, wherein the shank includes a shank wall including an outer face, the angelwing includes a body portion extending from a root portion to an opposite tip portion, the root portion coupled to the outer face of the shank wall radially inward from a platform of the rotor blade, the body portion including a radially outer surface that extends between the root portion and the tip portion, the radially outer surface extending substantially parallel to the first direction;
    defining at least one cooling passage extending through the shank wall and the angelwing, from at least one inlet opening defined in the outer face and radially inward from the root portion of the angelwing to at least one outlet opening defined in the radially outer surface of the body portion and offset from the tip portion, such that the at least one inlet opening is coupled in flow communication with an inner wheelspace of the gas turbine engine and the at least one outlet opening is coupled in flow communication with an outer rotor/stator cavity of the gas turbine engine; and
    supplying pressurized cooling air to the inner wheelspace, such that the pressurized cooling air is channeled into the at least one inlet opening and discharged from the at least one outlet opening forming a cooling air film layer adjacent to the radially outer surface.

2. A method in accordance with claim 1, said method comprising orienting the at least one outlet opening such that the pressurized cooling air is discharged in one of a radial direction relative to the axis of rotation, towards the first direction, and towards a second direction away from the first direction.

3. A method in accordance with claim 1, wherein a flow of combustion gases is channeled through the outer rotor/stator cavity, said method comprising orienting the at least one outlet opening such that the pressurized cooling air is discharged in one of an upstream direction relative to the flow of combustion gases and a downstream direction relative to the flow of combustion gases.

4. A method in accordance with claim 1, wherein defining at least one cooling passage comprises:
    defining a plurality of separate cooling passages; and
    coupling an inlet opening and an outlet opening to each separate cooling passage.

5. A method in accordance with claim 1, wherein defining at least one cooling passage comprises:
    defining at least one cooling passage;
    coupling a plurality of branch passages to the at least one cooling passage; and
    coupling at least one of an inlet opening and an outlet opening to each branch passage.

6. A method in accordance with claim 1, wherein coupling an angelwing to a shank of the rotor blade further comprises coupling the angelwing to a portion of the shank wall that is oriented one of towards a flow of combustion gases channeled through the gas turbine engine and away from a flow of combustion gases channeled through the gas turbine engine.

7. A method in accordance with claim 1, wherein the at least one cooling passage defines a first cooling passage and the rotor blade includes an airfoil coupled to the shank, said method comprising defining a second cooling passage extending through the shank to the airfoil.

8. A method in accordance with claim 1, said method comprising orienting the at least one outlet opening in a downstream portion of the radially outer surface proximate the root of the angelwing.

9. A method in accordance with claim 1, wherein the rotor blade includes an airfoil coupled to the shank, said method comprising orienting the at least one outlet opening in substantial circumferential alignment with a leading edge of the airfoil.

10. A method in accordance with claim 1, said method further comprising orienting a plurality of outlet openings in the radially outer surface of the angelwing such that the outlet openings are circumferentially spaced apart from each other along the upper surface of the angelwing.

11. A system for cooling an angelwing in a gas turbine engine, said system comprising:
    a rotor blade comprising a shank, said shank comprising a shank wall comprising an outer face, said rotor blade coupled for rotation in a first direction about an axis of the gas turbine engine;
    an angelwing coupled to said shank wall, said angelwing comprising a body portion extending from a root portion to an opposite tip portion, said root portion coupled to said outer face of said shank wall radially inward from a platform of the rotor blade, said body portion comprising a radially outer surface that extends between said root portion and said tip portion, said radially outer surface extending substantially parallel to the first direction; and at least one cooling passage defined within said shank wall and said angelwing, said at least one cooling passage extending from at least one inlet opening to at least one outlet opening, said at least one inlet opening located in said outer face and radially inward from said root portion of said angelwing, said at least one outlet opening located in said radially outer surface of said body portion and offset from said tip portion, such that said at least one inlet opening is coupled in flow communication with an inner wheelspace of the gas turbine engine and said at least one outlet opening is coupled in flow communication with an outer rotor/stator cavity of the gas turbine engine;

said at least one cooling passage configured for use in receiving pressurized cooling air from the inner wheelspace, such that the pressurized cooling air is channeled into said at least one inlet opening and discharged from said at least one outlet opening, said at least one outlet opening configure to form a cooling air film layer adjacent said radially outer surface.

12. A system in accordance with claim 11, said system comprising said at least one outlet opening oriented such that the pressurized cooling air is discharged in one of a radial direction relative to the axis of rotation, towards the first direction, and a second direction away from the first direction.

13. A system in accordance with claim 11, wherein a flow of combustion gases is channeled through the outer rotor/stator cavity, said system comprising said at least one outlet opening oriented such that the pressurized cooling air is discharged in one of an upstream direction relative to the flow of combustion gases and a downstream direction relative to the flow of combustion gases.

14. A system in accordance with claim 11, wherein said at least one cooling passage comprises:
  a plurality of distinct separate cooling passages; and
  an inlet opening and an outlet opening coupled to each separate cooling passage.

15. A system in accordance with claim 11, wherein said at least one cooling passage comprises:
  a plurality of branch passages coupled to said at least one cooling passage; and
  at least one of an inlet opening and an outlet opening coupled to each branch passage.

16. A system in accordance with claim 11, wherein said angelwing is coupled to said shank wall that is oriented one of toward a flow of combustion gases channeled through the gas turbine engine and away from a flow of combustion gases channeled through the gas turbine engine.

17. A system in accordance with claim 11, wherein said at least one cooling passage defines a first cooling passage, said rotor blade comprises an airfoil coupled to said shank and an airfoil cooling passage extending through said shank to said airfoil, the system further comprising a second cooling passage extending from said airfoil cooling passage to said at least one outlet opening.

18. A system in accordance with claim 11, wherein said at least one outlet opening is oriented in a downstream portion of said radially outer surface proximate said root of said angelwing.

19. A system in accordance with claim 11, wherein said at least one rotor blade includes an airfoil coupled to said shank, and said at least one outlet opening is oriented in substantial circumferential alignment with a leading edge of said airfoil.

20. A system in accordance with claim 11, said system comprising a plurality of outlet openings oriented in said radially outer surface of said angelwing such that said outlet openings are circumferentially spaced apart along said radially outer surface of said angelwing.

* * * * *